(12) United States Patent
Wang et al.

(10) Patent No.: US 10,545,366 B2
(45) Date of Patent: Jan. 28, 2020

(54) OPTICAL MODULATOR INCLUDING MULTIPLE MODULATION UNITS, BACKLIGHT MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Qian Wang, Beijing (CN); Xue Dong, Beijing (CN); Xiaochuan Chen, Beijing (CN); Wenqing Zhao, Beijing (CN); Jian Gao, Beijing (CN); Pengcheng Lu, Beijing (CN); Ming Yang, Beijing (CN)

(73) Assignees: BOE TECHNOLOGY GROUP CO., LTD., Beijing (CN); BEIJING BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 48 days.

(21) Appl. No.: 15/534,414

(22) PCT Filed: Nov. 11, 2016

(86) PCT No.: PCT/CN2016/105417
§ 371 (c)(1),
(2) Date: Jun. 8, 2017

(87) PCT Pub. No.: WO2017/118214
PCT Pub. Date: Jul. 13, 2017

(65) Prior Publication Data
US 2018/0052330 A1     Feb. 22, 2018

(30) Foreign Application Priority Data
Jan. 8, 2016    (CN) .......................... 2016 1 0012041

(51) Int. Cl.
*G02F 1/1335*    (2006.01)
(52) U.S. Cl.
CPC .... *G02F 1/133526* (2013.01); *G02F 2201/30* (2013.01)
(58) Field of Classification Search
CPC combination set(s) only.
See application file for complete search history.

(56) References Cited

U.S. PATENT DOCUMENTS

| 6,667,782 B1 | 12/2003 | Taira et al. |
| 2007/0070265 A1 | 3/2007 | Jung |
(Continued)

FOREIGN PATENT DOCUMENTS

| CN | 1291729 A | 4/2001 |
| CN | 1922539 A | 2/2007 |
(Continued)

OTHER PUBLICATIONS

International Search Report and Written Opinion in PCT/CN2016/105417 dated Feb. 8, 2017, with English translation.

*Primary Examiner* — Lauren Nguyen
(74) *Attorney, Agent, or Firm* — Womble Bond Dickinson (US) LLP

(57) ABSTRACT

The embodiments of the present invention provide an optical modulator, a backlight module and a display device. The optical modulator includes a first level modulation unit, a second level modulation unit and a third level modulation unit arranged in sequence. The first level modulation unit is a converging element for converging a light beam emitted from a light source. The second level modulation unit is a collimating element for converting the light beam from the first level modulation unit into a collimated light beam. The third level modulation unit is a redirecting element for
(Continued)

converting the collimated light beam from the second level modulation unit into a vertically emitted light beam.

15 Claims, 4 Drawing Sheets

(56) References Cited

U.S. PATENT DOCUMENTS

| | | | |
|---|---|---|---|
| 2007/0171493 A1 | 6/2007 | Nakanishi | |
| 2008/0129926 A1* | 6/2008 | Seo | G02B 6/0053 349/65 |
| 2008/0316380 A1* | 12/2008 | Ijzerman | G02B 27/2214 349/15 |
| 2012/0307178 A1* | 12/2012 | Cheng | G02F 1/133524 349/62 |
| 2015/0219911 A1* | 8/2015 | Cho | G02F 1/1393 349/15 |

FOREIGN PATENT DOCUMENTS

| | | |
|---|---|---|
| CN | 1991499 A | 7/2007 |
| CN | 101625458 A | 1/2010 |
| CN | 205281087 U | 6/2016 |
| JP | H 09292821 A | 11/1997 |

* cited by examiner

OPTICAL MODULATOR INCLUDING MULTIPLE MODULATION UNITS, BACKLIGHT MODULE AND DISPLAY DEVICE

RELATED APPLICATIONS

The present application is the U.S. national phase entry of the international application PCT/CN2016/105417, with an international filing date of Nov. 11, 2016, which claims the benefit of Chinese Patent Application No. 201610012041.1, filed on Jan. 8, 2016, the entire disclosures of which are incorporated herein by reference.

TECHNICAL FIELD

The present invention relates to the field of display technology, in particular to an optical modulator, a backlight module and a display device.

BACKGROUND

In recent years, with the development of science and technology, various display devices are gradually developed. On this basis, the requirements on the performance of display device are also getting higher and higher. Based on this, for the backlight of the display device, a vertical collimated light beam is desired.

However, in a backlight module, light from the light source is emitted in all directions. Therefore, even if the backlight module is modulated, it is difficult for the backlight module to emit a collimated light beam.

SUMMARY

The embodiments of the invention provide an optical modulator, a backlight module and a display device, in which light from the backlight module is modulated by an optical modulator. A collimated light beam can be output, and the light efficiency is improved.

To this end, the embodiments of the invention provide the following solutions.

According to a first aspect of the invention, an optical modulator is provided. The optical modulator includes a first level modulation unit, a second level modulation unit and a third level modulation unit arranged in sequence. The first level modulation unit is a converging element for converging a light beam emitted from a light source. The second level modulation unit is a collimating element for converting the light beam from the first level modulation unit into a collimated light beam. The third level modulation unit is a redirecting element for converting the collimated light beam from the second level modulation unit into a vertically emitted light beam.

Optionally, the first level modulation unit is a liquid crystal lens.

Optionally, the second level modulation unit is a transmission grating. The transmission grating includes a grating surface and groove surfaces. An acute angle is between the grating surface and the groove surfaces. By setting the acute angle between the grating surface and the groove surfaces and setting a pitch between two adjacent groove surfaces, the light beam from the first level modulation unit is converted into a collimated light beam with a predetermined angle and a predetermined wavelength.

Optionally, the third level modulation unit is an optical wedge which includes an inclined surface facing the second level modulation unit. A transition unit is provided between the second level modulation unit and the third level modulation unit, and the refractive index of the transition unit is smaller than the refractive index of the third level modulation unit.

According to a second aspect of the invention, a backlight module is provided. The backlight module includes a light source and the optical modulator according to the first aspect of the invention. The light source is arranged on a side of the first level modulation unit departing from the second level modulation unit Optionally, the light source is an LED array.

According to a third aspect of the invention, a display device is provided. The display device includes a backlight and a display panel. The display panel includes a basal substrate facing the backlight. The display device further includes the optical modulator according to the first aspect of the invention. The optical modulator is arranged on a surface of the basal substrate facing the backlight or a surface of the basal substrate departing from the backlight.

Optionally, the optical modulator is arranged between the backlight and the display panel, and the basal substrate is used as the third level modulation unit of the optical modulator.

Based on this, optionally, the display panel includes an array substrate, a counter substrate and a liquid crystal layer between the array substrate and the counter substrate. The array substrate includes the basal substrate, a thin film transistor arranged on the basal substrate and a pixel electrode electrically connected with a drain of the thin film transistor.

Further, the counter substrate includes a filter pattern.

The embodiments of the invention provide an optical modulator, a backlight module and a display device. When the light beam from the backlight passes through the first level modulation unit of the optical modulator with a convergence effect, the light intensity in a certain direction can be increased, improving the light efficiency. On this basis, when the light beam passes through the second level modulation unit, most of the light beam is converted into collimated light, and a small part of the light beam can be neglected since the energy is dispersed. Further, when the light beam passes through the third level modulation unit, the collimated light beam can be converted into a vertically emitted light beam, so as to realize the collimation modulation for the light beam emitted from the backlight, and improve the light efficiency.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

REFERENCE SIGNS

01—optical modulator; 02—backlight; 03—display panel; 10—first level modulation unit; 20—second level modulation unit; 30—third level modulation unit; 40—transition unit; 31—array substrate; 32—counter substrate; 101—first substrate; 102—second substrate; 103—liquid crystal layer; 201—grating surface; 202—groove surface; 311—basal substrate; 1011—first transparent substrate; 1012—first electrode; 1021—second transparent substrate; 1022—second electrode.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
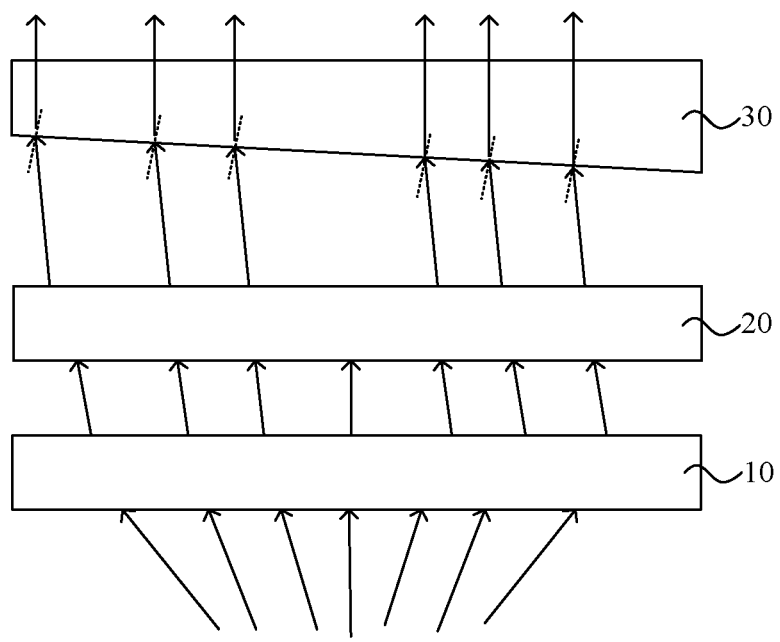
FIG. 1 is a schematic diagram of an optical modulator according to an embodiment of the invention.

As shown in FIG. 1, an embodiment of the invention provides an optical modulator 01. The optical modulator 01 includes a first level modulation unit 10, a second level modulation unit 20 and a third level modulation unit 30 arranged in sequence.

The first level modulation unit 10 is a converging element for converging a light beam emitted from a light source. The second level modulation unit 20 is a collimating element for converting the light beam from the first level modulation unit 10 into a collimated light beam. The third level modulation unit 30 is a redirecting element for converting the collimated light beam from the second level modulation unit 20 into a vertically emitted light beam.

It should be noted that, firstly, the first level modulation unit 10 can have a structure based on the principle of light refraction. When the light beam emitted by the light source passes through the first level modulation unit 10, the light beam is refracted based on the principle of light refraction. Compared with the incident light, the refracted light beam is converged to the vertical direction, thereby realizing the convergence function for light.

On this basis, for example, the second level modulation unit 20 can be a transmission grating, and the second level modulation unit 20 can also have a structure based on the principle of light diffraction. The incident light can be selected to ensure that most of the output light is collimated light, and a small part of the light beam can be neglected since the energy is dispersed.

In order to increase the light energy emitted from the second level modulation unit 20, at least a portion of the light beam from the first level modulation unit 10 is converged to a certain direction. That is, by applying the first level modulation unit 10, light emitted in a certain direction can be enhanced.

Further, the third level modulation unit 30 is an optical wedge. The third level modulation unit 30 can also have a structure based on the principle of light refraction. When the collimated light beam emitted from the second level modulation unit 20 passes through the third level modulation unit 30, based on the principle of light refraction, the collimated light beam is emitted in a vertical direction.

Secondly, FIG. 1 only schematically shows the modulation units of the optical modulator and the light path for the light beam passing through the modulation units.

The embodiments of the invention provide an optical modulator 01. When the light beam from the backlight passes through the first level modulation unit 10 of the optical modulator with a convergence effect, the light intensity in a certain direction can be increased, improving the light efficiency. On this basis, when the light beam passes through the second level modulation unit 20, most of the light beam is converted into collimated light, and a small part of the light beam can be neglected since the energy is dispersed. Further, when the light beam passes through the third level modulation unit 30, the collimated light beam can be converted into a vertically emitted light beam, so as to realize the collimation modulation for the light beam emitted from the backlight, and improve the light efficiency.

Optionally, the first level modulation unit is a liquid crystal lens.

Figure 2:
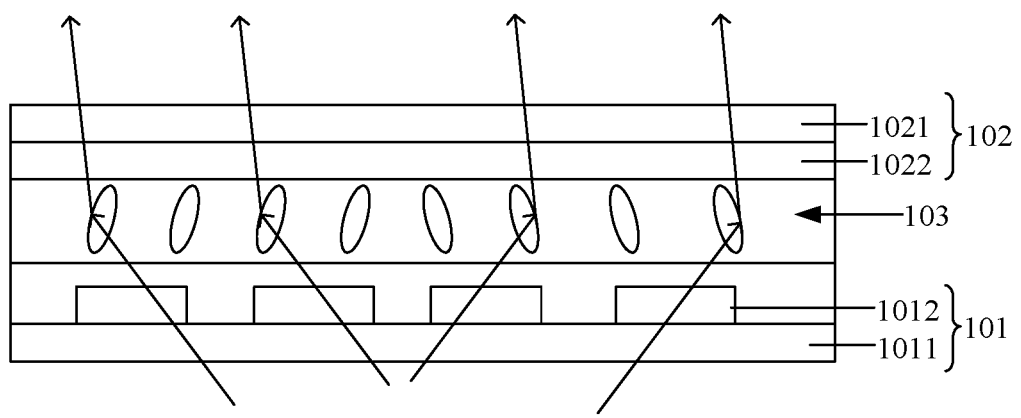
FIG. 2 is a schematic diagram of a first level modulation unit according to an embodiment of the invention.

In particular, as shown in FIG. 2, a liquid crystal lens can include a first substrate 101, a second substrate 102, and a liquid crystal layer 103 between the first substrate 101 and the second substrate 102. The first substrate 101 can include a first transparent substrate 1011 and a first electrode 1012 arranged on the first transparent substrate 1011. The second substrate 102 can include a second transparent substrate 1021 and a second electrode 1022 arranged on the second transparent substrate 1021.

For example, one of the first electrode 1012 and the second electrode 1022 can be set as a strip electrode, and the other can be set as a planar electrode. Of course, both of the first electrode 1012 and the second electrode 1022 can also be set as strip electrodes. In order to simplify the process, embodiments of the present invention may include a strip electrode and a planar electrode. In FIG. 2, the first electrode 1012 is a strip electrode, and the second electrode 1022 is a planar electrode.

On this basis, by applying an electric field generated between the first electrode 1012 and the second electrode 1022, the liquid crystal layer 103 between these two electrodes can be driven. Since the strip electrodes are mutually independent, a lens can be formed between each strip electrode and the corresponding planar electrode. By adjusting the voltage of the strip electrode, the light beam can be refracted into various directions by the liquid crystal layer, thereby realizing the control on the exit direction of light.

In the embodiment of the present invention, the first level modulation unit 10 is a liquid crystal lens, the exit direction of light can thus be flexibly controlled by adjusting the voltage difference between the first electrode 1012 and second electrode 1022. Therefore, an incident light beam with a desired angle can be provided for the second level modulation unit 20, and the light efficiency can be improved as much as possible.

Figure 3:
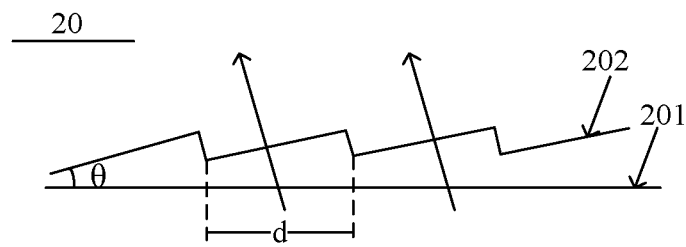
FIG. 3 is a schematic diagram of a second level modulation unit according to an embodiment of the invention.

Optionally, as shown in FIG. 3, the second level modulation unit 20 is a transmission grating. The transmission grating includes a grating surface 201 and groove surfaces 202. An acute angle $\theta$ is between the grating surface 201 and the groove surfaces 202. By setting the acute angle $\theta$ between the grating surface 201 and the groove surfaces 202 and setting a pitch d between two adjacent groove surfaces 202, the light beam from the first level modulation unit 10 is converted into a collimated light beam with a predetermined angle and a predetermined wavelength.

In particular, the second level modulation unit 20 extracts light based on the diffraction of the incident light beam. As shown in FIG. 3, if the incident light beam on the second level modulation unit 20 is perpendicular to the groove surfaces 202 and meets $2 d \cdot \sin \theta = \lambda$, the light beam with the wavelength $\lambda$ will be emitted in a certain direction (i.e., a direction perpendicular to the groove surfaces) by the transmission grating (i.e., blazed grating). By designing the values of d and $\theta$, various exit angles and wavelengths can be obtained.

In the embodiment of the invention, the light beam passing through the second level modulation unit 20 is a collimated light beam, so that all the included angles $\theta$ between the groove surfaces 202 and the grating surface 201 should be the same. The pitches between two adjacent groove surfaces 202 can be arranged as different with each other, so that a white light beam can be output by the second level modulation unit 20.

Based on the above description, the light beam with an improved intensity can be emitted by the blazed grating if the incident light beam is perpendicular to the groove surfaces 202. Therefore, the first level modulation unit 10 can be adjusted to increase the light intensity of the incident light beam on the groove surfaces 202. That is, the voltage on the first electrode 1012 and the second electrode 1022 can be adjusted, so as to increase the light intensity of the light beam perpendicular to the groove surfaces 202. In this way, after passing through the second level modulation unit 20, the light beam can be emitted in a direction perpendicular to the groove surfaces 202 by the blazed grating.

In the embodiment of the invention, the transmission grating is used to select the collimated light beam in a certain angle and emit the light beam in a blazed and strengthening mode, so that the output light energy is more concentrated, and the brightness of the output light beam can be ensured.

Figure 4:
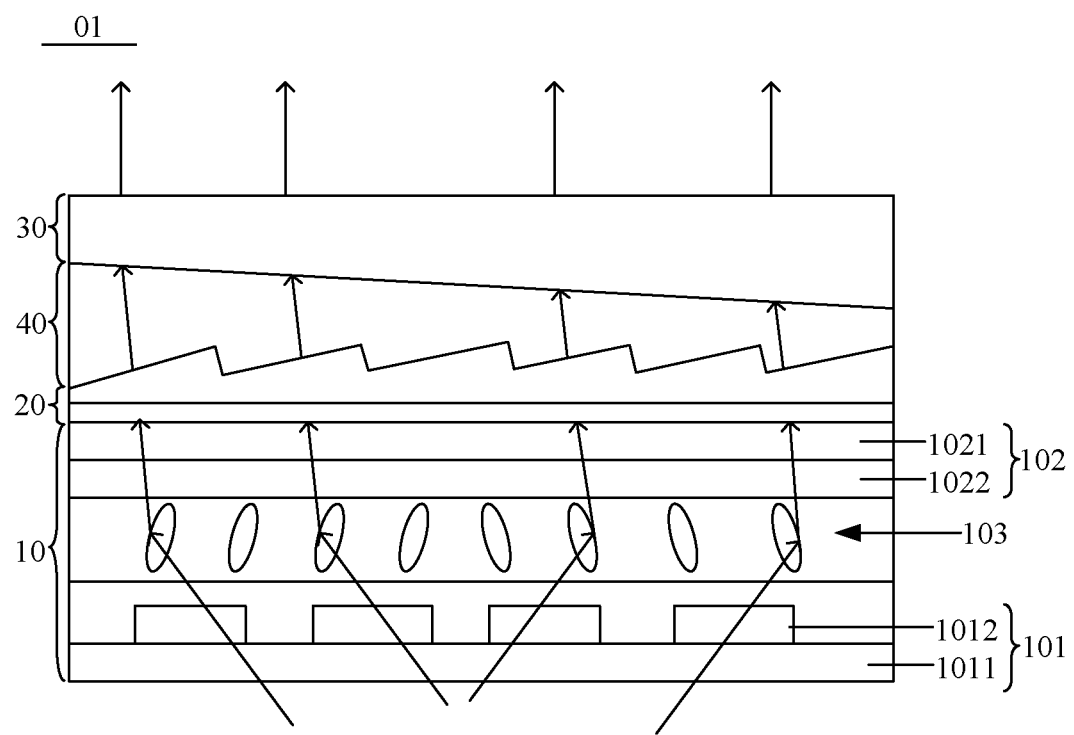
FIG. 4 is a schematic diagram of an optical modulator according to another embodiment of the invention.

Optionally, as shown in FIG. 4, the third level modulation unit 30 is an optical wedge which includes an inclined surface facing the second level modulation unit 20. A transition unit 40 is provided between the second level modulation unit 20 and the third level modulation unit 30, and the refractive index of the transition unit 40 is smaller than the refractive index of the third level modulation unit 30.

The refractive index of the transition unit 40 is denoted as n1, and the refractive index of the third level modulation unit is denoted as n2. The incidence angle of the light beam from the transition unit 40 to the third level modulation unit 30 is denoted as i1, and the exit angle is denoted as i2. According to the refraction law, i1×sin n1=i2×sin n2. Since n1<n2, i2<i1. Based on this, by adjusting the inclination angle of the inclined surface and the refractive indexes of the transition unit 40 and third level modulation unit 30, the light beam can be emitted in a vertical direction.

In the embodiment of the invention, the surface of the third level modulation unit 30 facing the second level modulation unit 20 is arranged as an inclined surface, and the material of the third level modulation unit 30 is a material with a high refractive index. The transition unit 40 is provided between the second level modulation unit 20 and the third level modulation unit 30, therefore, a vertically emitted light beam is realized with a relatively simple structure.

Figure 5:
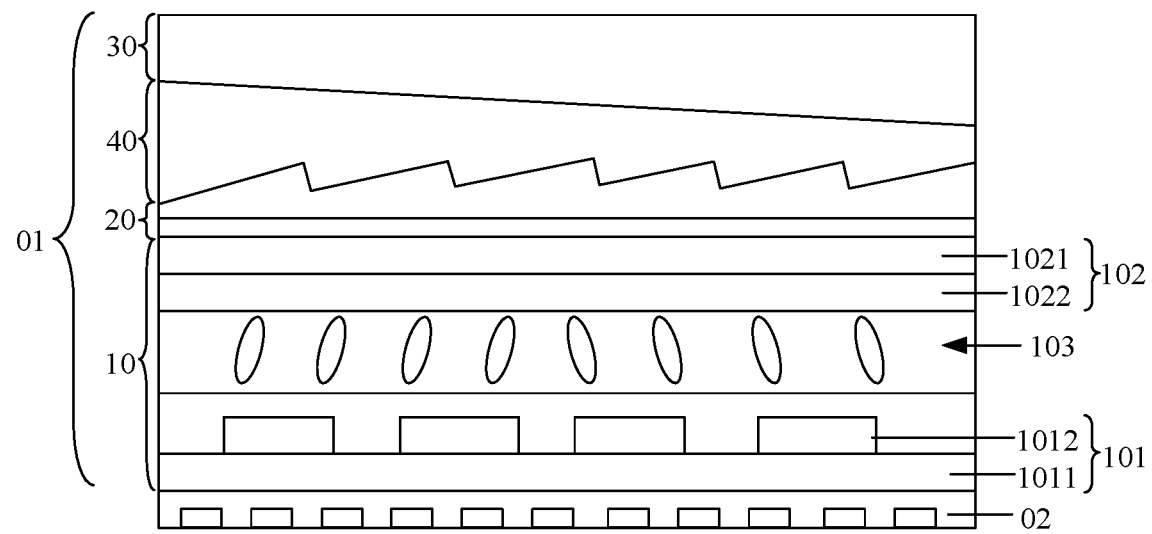
FIG. 5 is a schematic diagram of a backlight module according to an embodiment of the invention.

An embodiment of the invention further provides a backlight module. As shown in FIG. 5, the backlight module includes a light source 02 and the above mentioned optical modulator 01. The light source 02 is arranged on a side of the first level modulation unit 10 departing from the second level modulation unit 20.

The light source 02 is not limited herein.

In the embodiment of the invention, the light beam emitted from the light source 02 passes through the optical modulator 01, which can realize the collimation modulation for the light beam, improving the light efficiency. Therefore, the light emitting properties of the backlight module can be improved.

Since LED (Light Emitting Diode) has the advantages of small size, low power consumption, long service life and so on, optionally, the light source 02 is an LED array.

Figure 6:
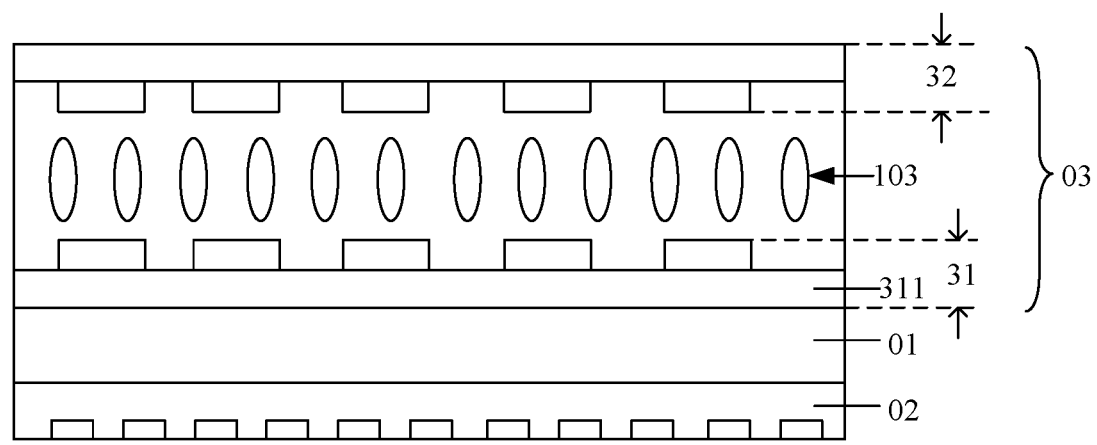
FIG. 6 is a schematic diagram of a display device according to an embodiment of the invention.

An embodiment of the invention further provides a display device. As shown in FIG. 6, the display device includes a backlight 02 and a display panel 03. The display panel 03 includes a basal substrate 311 facing the backlight 02. The display device further includes the above mentioned optical modulator 01. The optical modulator 01 is arranged on a surface of the basal substrate 311 facing the backlight 02 or a surface of the basal substrate 311 departing from the backlight 02.

It should be noted that the display panel 03 is a passive light emitting display panel. FIG. 6 shows a liquid crystal display panel as an example.

In the embodiment of the invention, after the light beam emitted by the backlight 02 passes through the optical modulator 01, the collimation modulation for the light beam can be realized. The light efficiency is improved, so that the display device has a better display effect.

Optionally, the backlight 02 is an LED array.

Figure 7:
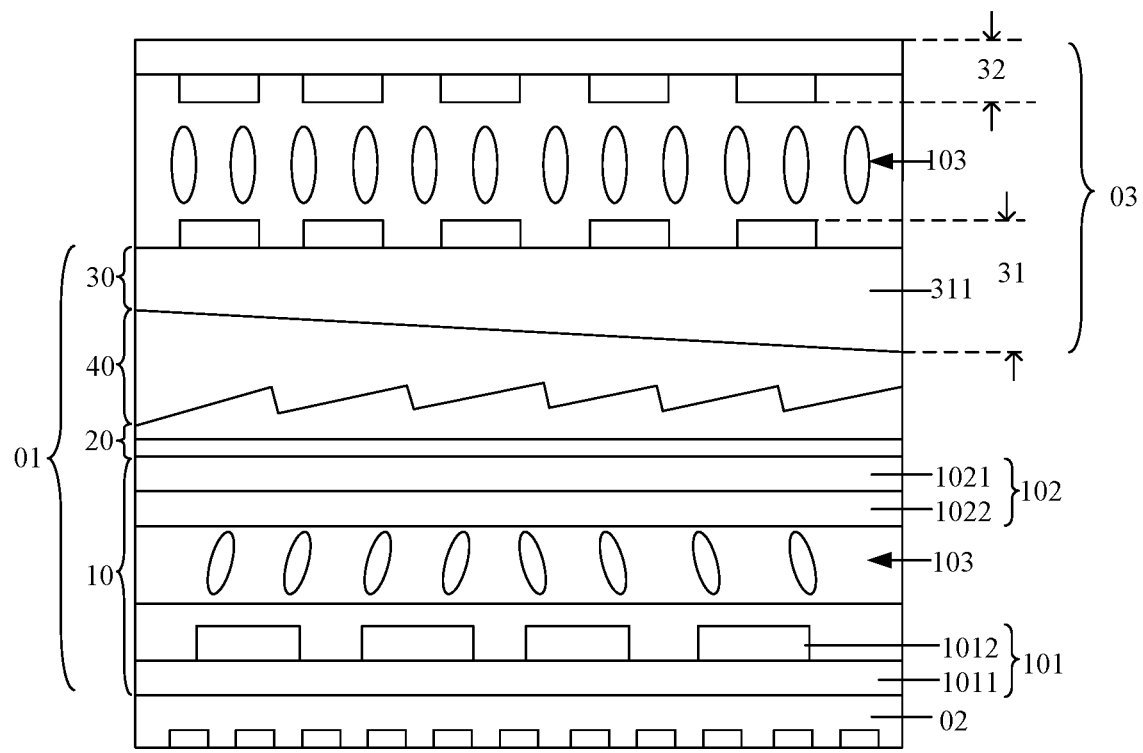
FIG. 7 is a schematic diagram of a display device according to another embodiment of the invention.

Optionally, as shown in FIG. 7, the optical modulator 01 is arranged between the backlight 02 and the display panel 03, and the basal substrate 311 is used as the third level modulation unit 30 of the optical modulator 01.

That is, by arranging the material and shape of the basal substrate 311, the basal substrate 311 can function as the third level modulation unit 30.

In some embodiments, the basal substrate 311 can function as the third level modulation unit 30, so as to reduce the thickness of the display device.

Based on this, as shown in FIG. 6 and FIG. 7, the display panel 03 can include an array substrate 31, a counter substrate 32 and a liquid crystal layer 103 between the array substrate 31 and the counter substrate 32. The array substrate 31 includes the basal substrate 311, a thin film transistor arranged on the basal substrate 311 and a pixel electrode. The thin film transistor includes a gate, a gate insulating layer, a semiconductor active layer, a source and a drain, and the drain is electrically connected with the pixel electrode.

Further, a common electrode can be arranged on the array substrate 31 or the counter substrate 32.

For an In-Plane Switching type (IPS) array substrate, the pixel electrode and the common electrode can be arranged at intervals in the same layer, and they can be arranged as strip electrodes. For an Advanced-super Dimensional Switching type (ADS) array substrate, the pixel electrode and the common electrode are arranged in different layers, the upper one of them is arranged as a strip electrode, and the lower one of them is arranged as a plate electrode or a strip electrode.

On this basis, the counter substrate 32 can include a filter pattern. The filter pattern can include a red filter pattern, a green filter pattern and a blue light filter pattern, or other filter patterns with three primary colors.

In the embodiments of the invention, the filter pattern is arranged on the counter substrate 32 rather than on the array substrate 31, the manufacturing process of the array substrate 31 can thus be simplified.

Based on the above description, the display device in the embodiment of the invention can be any product or component with display function, such as mobile phone, tablet computer, TV, display, notebook computer, digital photo frame, navigator and so on.

The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

What is claimed is:

1. An optical modulator comprising: a first level modulation unit, a second level modulation unit and a third level modulation unit arranged in sequence;
   wherein the first level modulation unit is a converging element for converging a light beam emitted from a light source;
   wherein the second level modulation unit is a transmission grating; the transmission grating comprises a grating surface and groove surfaces; an acute angle is between the grating surface and the groove surfaces; by setting the acute angle between the grating surface and the groove surfaces and setting a pitch between two adjacent groove surfaces, the light beam from the first level modulation unit is converted into a collimated light beam with a predetermined angle and a predetermined wavelength;
   wherein the third level modulation unit is an optical wedge for converting the collimated light beam from the second level modulation unit into a vertically emitted light beam; the optical wedge comprises an inclined surface facing the second level modulation unit, and the inclined surface is a flat surface; an inclined direction of the inclined surface is opposite to an inclined direction of the groove surfaces;
   and wherein a transition unit is provided between the second level modulation unit and the third level modulation unit, and the refractive index of the transition unit is smaller than the refractive index of the third level modulation unit.

2. The optical modulator according to claim 1, wherein the first level modulation unit is a liquid crystal lens.

3. A backlight module comprising a light source and the optical modulator according to claim 1;
   wherein the light source is arranged on a side of the first level modulation unit departing from the second level modulation unit.

4. The backlight module according to claim 3, wherein the light source is an LED array.

5. A display device comprising a backlight and a display panel; wherein the display panel comprises a basal substrate facing the backlight; the display device further comprises the optical modulator according to claim 1;
   and wherein the optical modulator is arranged on a surface of the basal substrate facing the backlight or a surface of the basal substrate departing from the backlight.

6. The display device according to claim 5, wherein the optical modulator is arranged between the backlight and the display panel, and the basal substrate is used as the third level modulation unit of the optical modulator.

7. The display device according to claim 5, wherein the display panel comprises an array substrate, a counter substrate and a liquid crystal layer between the array substrate and the counter substrate;
   and wherein the array substrate comprises the basal substrate, a thin film transistor arranged on the basal substrate and a pixel electrode electrically connected with a drain of the thin film transistor.

8. The display device according to claim 7, wherein the counter substrate comprises a filter pattern.

9. The backlight module according to claim 3, wherein the first level modulation unit is a liquid crystal lens.

10. The display device according to claim 5, wherein the first level modulation unit is a liquid crystal lens.

11. The display device according to claim 5, wherein the second level modulation unit is a transmission grating; the transmission grating comprises a grating surface and groove surfaces; an acute angle is between the grating surface and the groove surfaces; by setting the acute angle between the grating surface and the groove surfaces and setting a pitch between two adjacent groove surfaces, the light beam from the first level modulation unit is converted into a collimated light beam with a predetermined angle and a predetermined wavelength.

12. The display device according to claim 5, wherein the third level modulation unit is an optical wedge comprising an inclined surface facing the second level modulation unit;
   and wherein a transition unit is provided between the second level modulation unit and the third level modulation unit, and the refractive index of the transition unit is smaller than the refractive index of the third level modulation unit.

13. The display device according to claim 6, wherein the display panel comprises an array substrate, a counter substrate and a liquid crystal layer between the array substrate and the counter substrate;
   and wherein the array substrate comprises the basal substrate, a thin film transistor arranged on the basal substrate and a pixel electrode electrically connected with a drain of the thin film transistor.

14. The optical modulator according to claim 1, wherein an incident light beam on the grating surface is perpendicular to the groove surfaces and meets $2d \cdot \sin\theta = \lambda$, and the incident light beam is emitted in a direction perpendicular to the groove surfaces; d is a pitch between two adjacent groove surfaces, $\theta$ is the acute angle, and $\lambda$ is a wavelength of the incident light beam.

15. The optical modulator according to claim 1, wherein pitches between two adjacent groove surfaces are arranged as different with each other, so that a white light beam is output by the second level modulation unit.

* * * * *